United States Patent
Jin et al.

(10) Patent No.: US 10,527,447 B2
(45) Date of Patent: Jan. 7, 2020

(54) DISPLAY DEVICE AND DISPLAY SYSTEM

(71) Applicant: Toyota Jidosha Kabushiki Kaisha, Toyota-shi Aichi-ken (JP)

(72) Inventors: Xin Jin, Nagoya (JP); Ryohei Obara, Nisshin (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 154 days.

(21) Appl. No.: 15/680,851

(22) Filed: Aug. 18, 2017

(65) Prior Publication Data

US 2018/0052003 A1 Feb. 22, 2018

(30) Foreign Application Priority Data

Aug. 22, 2016 (JP) .................... 2016-162180

(51) Int. Cl.
*G01C 21/36* (2006.01)
*B62D 15/02* (2006.01)
*B60R 16/023* (2006.01)

(52) U.S. Cl.
CPC ........ *G01C 21/367* (2013.01); *B60R 16/0231* (2013.01); *B62D 15/021* (2013.01); *G01C 21/3676* (2013.01); *G01C 21/3697* (2013.01)

(58) Field of Classification Search
USPC ........................................................ 701/455
See application file for complete search history.

(56) References Cited

U.S. PATENT DOCUMENTS

| | | | | |
|---|---|---|---|---|
| 4,992,947 A * | 2/1991 | Nimura | ............. | G01C 21/3626 340/990 |
| 6,208,927 B1 * | 3/2001 | Mine | ............. | B60K 31/0058 701/70 |
| 6,219,609 B1 * | 4/2001 | Matsuno | ............. | B60T 8/1755 303/140 |
| 6,370,475 B1 * | 4/2002 | Breed | ............. | B60N 2/2863 340/436 |
| 7,085,637 B2 * | 8/2006 | Breed | ............. | B60N 2/2863 701/38 |

(Continued)

FOREIGN PATENT DOCUMENTS

JP 2006-023127 A 1/2006
JP 2008-232956 A 10/2008

(Continued)

*Primary Examiner* — Jean Paul Cass
(74) *Attorney, Agent, or Firm* — Dinsmore & Shohl LLP

(57) ABSTRACT

A display device includes a display, a position detector, a storage device and an electronic control unit that are provided in a vehicle. The electronic control unit is configured to control the display such that a map view is shown on the display on the basis of a map information, control the display such that an image indicating a position of the vehicle, detected by the position detector, is superimposed on the map view shown on the display, acquire information about a traveling status of the vehicle, determine whether a user of the vehicle is getting lost on the basis of the information about the traveling status of the vehicle and the map information, and, when the electronic control unit determines that the user is getting lost, control the display such that the scale of the map view shown on the display is set to a predetermined value or larger.

5 Claims, 10 Drawing Sheets

(56) References Cited

U.S. PATENT DOCUMENTS

| | | | |
|---|---|---|---|
| 7,202,776 B2* | 4/2007 | Breed | B60N 2/2863 340/435 |
| 8,849,494 B1* | 9/2014 | Herbach | B60W 30/00 701/24 |
| 9,052,200 B1* | 6/2015 | Shaik | G01C 21/3415 |
| 9,599,477 B1* | 3/2017 | Aula | E05F 15/70 |
| 9,702,830 B1* | 7/2017 | Akselrod | G06K 9/00671 |
| 2003/0075529 A1* | 4/2003 | Mazumder | B23K 26/0643 219/121.6 |
| 2004/0061626 A1* | 4/2004 | Kubota | B60K 31/0008 701/96 |
| 2006/0106536 A1* | 5/2006 | Park | G01C 21/32 701/451 |
| 2007/0196808 A1* | 8/2007 | Call | G09B 5/00 434/350 |
| 2008/0165018 A1* | 7/2008 | Breed | G08G 1/161 340/573.1 |
| 2010/0289632 A1* | 11/2010 | Seder | G01S 13/723 340/436 |
| 2011/0251749 A1* | 10/2011 | Schwarz | B60T 7/12 701/31.4 |
| 2013/0162626 A1* | 6/2013 | Gabara | G06T 17/05 345/419 |
| 2013/0162627 A1* | 6/2013 | Gabara | G06T 17/05 345/419 |
| 2013/0166191 A1* | 6/2013 | Gabara | G01C 21/367 701/409 |
| 2013/0167014 A1* | 6/2013 | Gabara | H04W 4/21 715/240 |
| 2014/0244161 A1* | 8/2014 | Strassenburg-Kleciak | G01C 21/3635 701/436 |
| 2015/0362328 A1* | 12/2015 | Li | G01C 21/20 701/411 |
| 2016/0327399 A1* | 11/2016 | Ronnang | B60K 35/00 |
| 2017/0008521 A1* | 1/2017 | Braunstein | G01C 21/32 |
| 2017/0138748 A1 | 5/2017 | Murai et al. | |
| 2018/0075538 A1* | 3/2018 | Konrardy | G06Q 40/08 |
| 2018/0115546 A1* | 4/2018 | Ito | H04W 4/80 |
| 2018/0188332 A1* | 7/2018 | Newman | B60K 35/00 |
| 2018/0348762 A1* | 12/2018 | Hilnbrand | G01C 21/30 |

FOREIGN PATENT DOCUMENTS

| | | |
|---|---|---|
| JP | 2009-092534 A | 4/2009 |
| JP | 2012-018019 A | 1/2012 |
| JP | 2015-034897 A | 2/2015 |
| JP | 2015-108519 A | 6/2015 |
| JP | 2016-017842 A | 2/2016 |

* cited by examiner

DISPLAY DEVICE AND DISPLAY SYSTEM

CROSS-REFERENCE TO RELATED APPLICATIONS

This application claims priority to Japanese Patent Application No. 2016-162180 filed on Aug. 22, 2016, which is incorporated herein by reference in its entirety including the specification, drawings and abstract.

BACKGROUND

1. Technical Field

The disclosure relates to a display device and a display system.

2. Description of Related Art

There is known a navigation system that changes the scale of a map view to a scale in which minor streets are visually recognizable as a vehicle reaches an area around a set destination (see, for example, Japanese Patent Application Publication No. 2009-92534 (JP 2009-92534 A), or the like).

SUMMARY

However, for example, when no destination is set or when the scale of a map view in a place other than an area around a destination is intended to be increased, a user including a driver of the vehicle is required to perform an operation to change the scale, so there is room for improvement in terms of convenience.

The disclosure provides a display device and display system that are able to automatically change the scale of a map view in a situation in which a user of a vehicle needs to increase the scale of the map view.

An aspect of the disclosure provides a display, a position detector, a storage device and an electronic control unit that are provided in a vehicle. The position detector is configured to detect a position of the vehicle. The storage device is configured to store map information. The electronic control unit is configured to control the display such that a map view is shown on the display on the basis of the map information, control the display such that an image indicating the position of the vehicle, detected by the position detector, is superimposed on the map view shown on the display, acquire information about a traveling status of the vehicle, determine whether a user of the vehicle is getting lost on the basis of the information about the traveling status of the vehicle and the map information, and, when the electronic control unit determines that the user is getting lost, control the display such that the scale of the map view shown on the display is set to a predetermined value or larger. The predetermined value is set as a predetermined scale at which the convenience of map reference increases at the time when the user is getting lost. Specifically, the predetermined value is a scale corresponding to a detailed map (for example, a 1:5000 scale, a 1:2500 scale, or the like).

With the display device according to this aspect, it is possible to acquire a travel route, or the like, of the vehicle on the basis of the information about the traveling status of the vehicle and the map information and determine whether the user of the vehicle is getting lost. Therefore, when the user of the vehicle is getting lost, it is possible to set the scale of the map view to the predetermined value or larger. For this reason, in a situation in which the user needs to increase the scale of the map view to the predetermined value or larger like a situation in which the user is getting lost, it is possible to improve the convenience of the user by automatically changing the scale of the map view to the predetermined value or larger.

In the display device according to the above aspect, the electronic control unit may be configured to acquire the position of the vehicle from the position detector as the information about the traveling status of the vehicle. The electronic control unit may be configured to identify a road on which the vehicle is traveling and the width of the road on the basis of the position of the vehicle and the map information. The electronic control unit may be configured to, when the vehicle has crossed a road on which the vehicle has once traveled or has traveled again on the road in a period during which the width of the road remains smaller than a predetermined width, determine that the user is getting lost.

With the display device according to this aspect, when the vehicle crosses a road on which the vehicle has once traveled or has traveled again on the road in a period during which the vehicle is traveling on a relatively narrow road like in a residential area, or the like, it may be specifically determined that the user of the vehicle is getting lost.

The display device according to the above aspect may further include a vehicle speed detector and a steering angle detector. The vehicle speed detector is provided in the vehicle. The vehicle speed detector is configured to detect a vehicle speed of the vehicle. The steering angle detector is provided in the vehicle. The steering angle detector is configured to detect a steering angle of the vehicle. The electronic control unit may be configured to acquire the position, vehicle speed and steering angle of the vehicle from the position detector, the vehicle speed detector and the steering angle detector as the information about the traveling status of the vehicle. The electronic control unit may be configured to identify a road on which the vehicle is traveling and the width of the road on the basis of the position of the vehicle and the map information. The electronic control unit may be configured to, when the width of the road is smaller than a predetermined width, when the vehicle speed of the vehicle is lower than or equal to a predetermined speed lower than a regulation speed of the road and when the steering angle of the vehicle indicates that the vehicle was about to enter a one-way road in a reverse direction, determine that the user is getting lost.

With the display device according to this aspect, when the vehicle is traveling on a relatively narrow road like in a residential area, or the like, when the vehicle speed is somewhat lower than a regulation speed and when the vehicle was about to enter a one-way road in the reverse direction, it may be specifically determined that the user of the vehicle is getting lost.

In the display device according to the above aspect, the electronic control unit may be configured to acquire the position of the vehicle from the position detector as the information about the traveling status of the vehicle. The electronic control unit may be configured to identify a road on which the vehicle is traveling and the width of the road on the basis of the position of the vehicle and the map information. The electronic control unit may be configured to, when the width of the road is smaller than a predetermined width and when the vehicle has turned around during traveling has traveled in an opposite direction, determine that the user is getting lost.

With the display device according to this aspect, when the vehicle is traveling on a relatively narrow road like in a residential area, or the like, and when the vehicle has turned around by U-turn, or the like, has traveled in the opposite direction, it may be specifically determined that the user of the vehicle is getting lost.

In the display device according to the above aspect, the electronic control unit may be configured to, when the electronic control unit controls the display such that the scale of the map view is set to the predetermined value or larger at the time when the electronic control unit determines that the user is getting lost and, after that, when the width of the road becomes larger than or equal to the predetermined width, control the display such that the scale of the map view is returned to a scale before being set to the predetermined value or larger.

With the display device according to this aspect, when the vehicle has gone out from a relatively narrow road like in a residential area, or the like, to a relatively wide road, it may be determined that the user has escaped from a getting-lost situation. For this reason, in this case, by automatically returning the scale of the map view to a scale before being set to the predetermined value or larger, the user does not need to perform an operation to return the scale of the map view to a scale before being set to the predetermined value or larger, so it is possible to improve the convenience of the user.

Another aspect of the disclosure provides a display system. The display system includes a display, a position detector, a first transmission unit, a first reception unit, a storage device, a first electronic control unit, a second transmission unit, a second reception unit and a second electronic control unit. The display is provided in a cabin of a vehicle. The position detector is provided in the vehicle. The position detector is configured to detect a position of the vehicle. The first transmission unit is provided in the vehicle. The first transmission unit is configured to acquire information about a traveling status of the vehicle and transmit the information to a center arranged remote from the vehicle. The first reception unit is provided in the center. The first reception unit is configured to receive the information transmitted from the first transmission unit. The storage device is provided in the center. The storage device is configured to store map information. The first electronic control unit is provided in the center. The first electronic control unit is configured to determine whether a user of the vehicle is getting lost on the basis of the information received by the first reception unit and the map information. The second transmission unit is provided in the center. The second reception unit is provided in the vehicle. The second reception unit is configured to receive a signal that is transmitted from the second transmission unit. The second electronic control unit is provided in the vehicle. The second electronic control unit is configured to control the display such that a map view is shown on the display. The first electronic control unit is configured to control the second transmission unit such that the second transmission unit transmits a predetermined signal to the vehicle when the first electronic control unit determines that the user is getting lost. The second electronic control unit is configured to control the display such that an image indicating the position of the vehicle, detected by the position detector, is superimposed on the map view shown on the display. The second electronic control unit is configured to, when the second reception unit has received the predetermined signal, control the display such that the scale of the map view is set to a predetermined value or larger.

With the display system according to this aspect, the center arranged remote from the vehicle is able to acquire a travel route, or the like, of the vehicle on the basis of the information about the traveling status of the vehicle and the map information and determine whether the user of the vehicle is getting lost. Therefore, when the user of the vehicle is getting lost, it is possible to set the scale of the map view to the predetermined value or larger on the basis of a control signal from the center. For this reason, in a situation in which the user needs to increase the scale of the map view to the predetermined value or larger like in a situation that the user is getting lost, it is possible to improve the convenience by automatically changing the scale of the map view to the predetermined value or larger.

According to the aspects of the disclosure, it is possible to provide the display device and the display system that are able to automatically change the scale of the map view to the predetermined value or larger in a situation in which the user of the vehicle needs to increase the scale of the map view to the predetermined value or larger.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings.

First Embodiment

Figure 1:
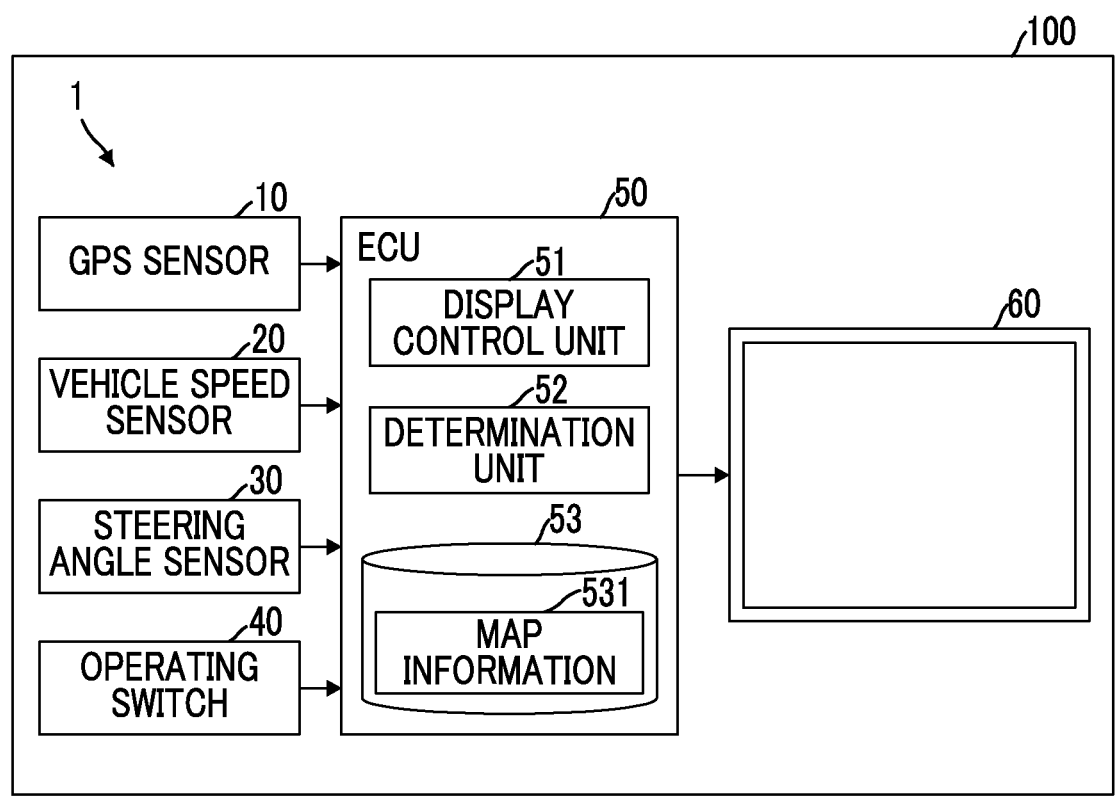
FIG. 1 is a block diagram that schematically shows an example of the configuration of a navigation system according to a first embodiment.

FIG. 1 is a block diagram that schematically shows an example of the configuration of a navigation system 1 according to the present embodiment. The navigation system 1 shows a map view of an area around the current position of a vehicle 100 (host vehicle) in a vehicle cabin (display 60 (described later)) in response to an operation of a user including a driver of the vehicle 100 (hereinafter, simply referred to as user). The navigation system 1 shows a route from the current position of the vehicle 100 to a destination that is set by the user or a destination that is automatically set on the basis of a past travel history, or the like, on the map view, and performs route guidance. The following description does not depend on whether the navigation system 1 is performing route guidance.

The navigation system 1 (an example of a display device) is provided in the vehicle 100. The navigation system 1 includes a GPS sensor 10, a vehicle speed sensor 20, a steering angle sensor 30, an operating switch 40, an ECU 50 and the display 60.

The navigation system 1 may be provided in the vehicle 100 in such a manner that the navigation system 1 is mounted on the vehicle 100, that is, the navigation system 1 is installed in the vehicle 100. Alternatively, the navigation system 1 may be provided in the vehicle 100 in such a manner that the navigation system 1 is removable from the vehicle 100. Hereinafter, the navigation system 1 is predicated on the manner that the navigation system 1 is mounted on the vehicle 100 (that is, the navigation system 1 is installed in the vehicle 100); however, the functions of the navigation system 1 may be, for example, implemented by a mobile terminal (for example, a smartphone, a tablet terminal, or the like) carried by the user into the cabin of the vehicle 100.

The GPS sensor 10 (an example of a position detector) receives GPS signals that are distributed from three or more GPS satellites that orbit around the earth, and detects (measures) the position of the vehicle 100 on the basis of the GPS signals (GPS measurement). The GPS sensor 10 is communicably connected to the ECU 50 via an in-vehicle network, such as a one-to-one communication line and a controller area network (CAN), and outputs a detected signal corresponding to the position of the vehicle 100 to the ECU 50.

The position of the vehicle 100 may be detected by a device other than the GPS sensor 10. For example, the ECU 50 may detect the position of the vehicle 100 with the use of global navigation satellite system (GNSS)/inertial navigation system (INS) hybrid navigation, or the like, on the basis of detected results of the vehicle speed sensor 20, acceleration sensor and gyro sensor in addition to a detected result of the GPS sensor 10. The acceleration sensor detects the acceleration of the vehicle. The gyro sensor detects the angular velocity of the vehicle.

The vehicle speed sensor 20 (an example of a vehicle speed detector) is a known detector that detects the vehicle speed of the vehicle 100. The vehicle speed sensor 20 is communicably connected to the ECU 50 via the in-vehicle network, such as a one-to-one communication line and a CAN. The vehicle speed sensor 20 outputs a detected signal corresponding to the vehicle speed of the vehicle 100 to the ECU 50.

As described above, when the functions of the navigation system 1 are implemented by a mobile terminal, or the like, the mobile terminal is, for example, able to detect (calculate) the vehicle speed of the vehicle 100 by differentiating a detected result of the built-in GPS sensor 10.

The steering angle sensor 30 (an example of a steering angle detector) is a known detector that detects the steering angle of the vehicle 100 (specifically, a steering device that is mounted on the vehicle 100). The steering angle sensor 30 is communicably connected to the ECU 50 via the in-vehicle network, such as a one-to-one communication line and a CAN. The steering angle sensor 30 outputs a detected signal corresponding to the steering angle of the vehicle 100 to the ECU 50.

As described above, when the functions of the navigation system 1 are implemented by a mobile terminal, or the like, the mobile terminal is, for example, able to recognize the turning state of the vehicle 100 on the basis of detected results of built-in G sensor and gyro sensor and acquire information corresponding to the steering angle of the vehicle 100.

The operating switch 40 is an operating unit for changing the scale of a map view that is shown on the display 60. The user including the driver of the vehicle 100 is allowed to gradually increase or reduce the scale of a map view that is shown on the display 60 within a predetermined range (for example, a range of 1:2500 scale to 1:500000 scale) by operating the operating switch 40.

The ECU 50 is an electronic control unit that executes various control processes in the navigation system 1. The ECU 50 is, for example, mainly formed of a microcomputer including a CPU, a RAM, a ROM, an I/O, and the like, and implements various control processes by executing various programs stored in the ROM on the CPU. The ECU 50 includes a display control unit 51 and a determination unit 52 as functional units that are implemented by executing one or more programs stored in the ROM. The ECU 50 includes a storage unit 53 as a storage area that is defined in advance in an internal memory, such as the ROM.

The display control unit 51 executes control process for generating various views to be shown on the display 60 and causing the display 60 to show the various views in response to a selecting operation of the user with a predetermined operating unit (not shown). For example, when the user performs a selecting operation for causing the display 60 to show information about the navigation system 1, the display control unit 51 generates a map view on the basis of map information 531 stored in the storage unit 53, and causes the display 60 to show the map view. At this time, the display control unit 51 causes the display 60 to show an image indicating the position of the vehicle 100, detected by the GPS sensor 10, on the map view in a superimposed manner. As for the scale of the map view to be shown on the display 60, for example, the value of an initial state after turning on the ignition of the vehicle 100 (IG-ON) is determined in advance, and the user is allowed to change the scale of the map with the use of the operating switch 40 as described above. When the determination unit 52 determines that the user of the vehicle 100 is getting lost as will be described later in a state where a map view is shown on the display 60, and when the scale of the map view is smaller than a redetermined value (for example, 1:5000 scale corresponding to a detailed map from which minor streets, one-way traffic signs, the names of buildings, and the like, are recognizable), the display control unit 51 increases the scale of the map view, that is, the display control unit 51 changes the scale of the map view to a scale larger than or equal to the scale corresponding to a detailed map (for example, 1:5000 scale, 1:2500 scale, or the like). Details will be described later.

When the navigation system 1 performs route guidance, the display control unit 51 causes the display 60 to show a route to a destination on the map view in a known display mode.

The display control unit 51 may cause the display 60 to show other information (for example, a view for setting an air conditioner, an image of an area around the vehicle 100, captured by a camera mounted on the vehicle 100, or the like) in response to a selecting operation of the user. Hereinafter, in the present embodiment, description will proceed on the assumption that a map view is shown on the display 60.

The determination unit 52 determines whether the user of the vehicle 100 is getting lost on the basis of information about the traveling status of the vehicle 100. The information about the traveling status of the vehicle 100 includes, for example, the position of the vehicle 100, detected by the GPS sensor 10, the vehicle speed of the vehicle 100, detected by the vehicle speed sensor 20, the steering angle of the vehicle 100, detected by the steering angle sensor 30, and the like. The details of the determination method that is used by the determination unit 52 will be described later. After the determination unit 52 determines that the vehicle 100 is getting lost, the determination unit 52 determines whether the vehicle 100 has gone out from a residential area. This is because, as will be described later, a situation in which the vehicle 100 is traveling in a residential area is included as a precondition to determine that the user is getting lost. Specifically, the determination unit 52 identifies a road on which the vehicle 100 is traveling and the width of the road on the basis of the position of the vehicle 100, detected by the GPS sensor 10, and the map information 531. When the width of the road on which the vehicle 100 is traveling is not smaller than a predetermined width (that is, the width of the road is larger than or equal to the predetermined width), the determination unit 52 determines that the vehicle 100 has gone out from a residential area; otherwise, the determination unit 52 determines that the vehicle 100 has not gone out from a residential area.

The storage unit 53 contains the map information 531 as described above. The map information 531 includes information, such as the width of each road, the regulation speed of each road, whether each road is one-way traffic, and the direction of one-way traffic.

The display 60 shows various pieces of information including a map view in response to a control process that is executed by the display control unit 51. The display 60 is arranged at a visually-recognizable location from a driver seat in the cabin of the vehicle 100, that is, for example, the transverse center of an instrument panel.

As described above, when the functions of the navigation system 1 are implemented by a mobile terminal, or the like, the user, for example, just needs to arrange the mobile terminal carried into the cabin of the vehicle 100 at a visually-recognizable location from the driver seat. Thus, the user is allowed to visually recognize a map view that is shown on a display of the mobile terminal.

Next, the process of automatically changing the scale of a map view (map scale changing process), which is executed by the navigation system 1 according to the present embodiment, will be described with reference to FIG. 2 and FIG. 3.

Figure 2:
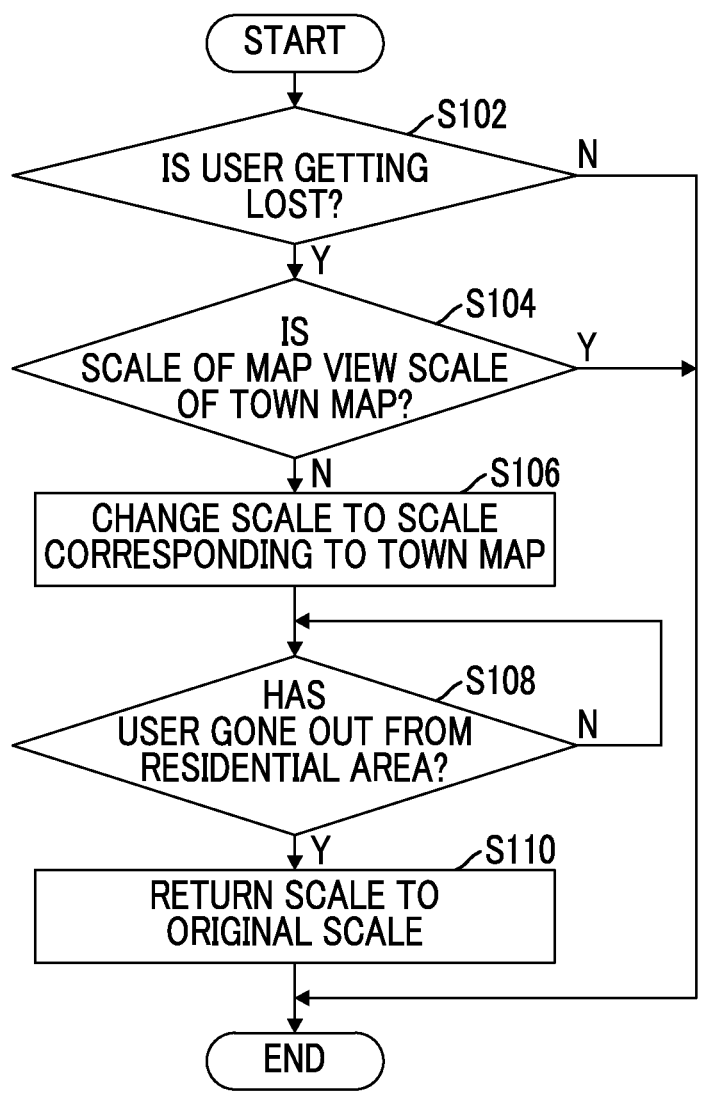
FIG. 2 is a flowchart that schematically shows an example of a map scale changing process that is executed by the navigation system according to the first embodiment.
Figure 3A:
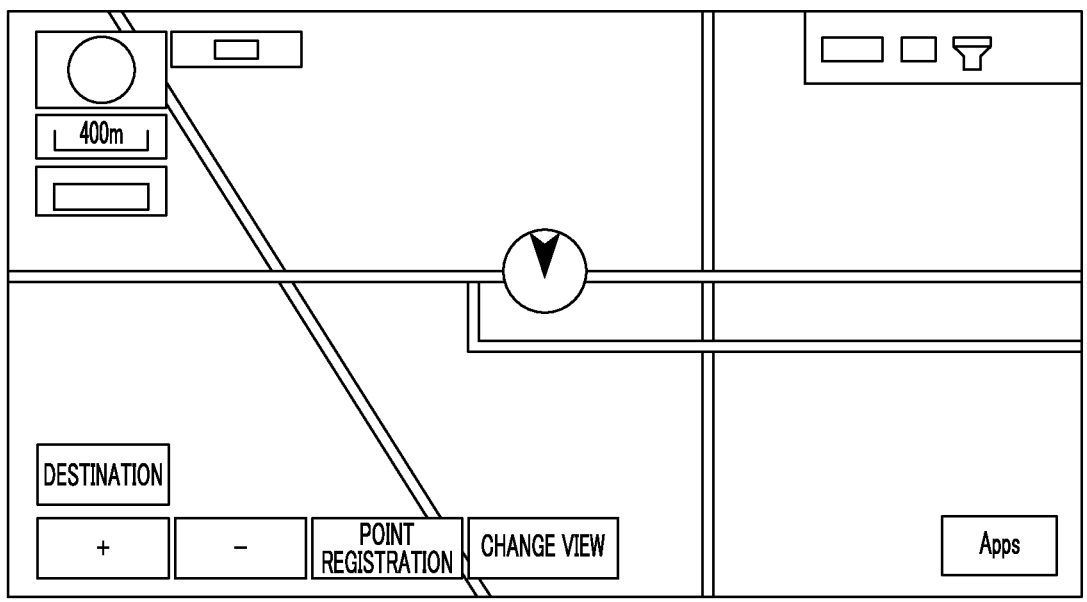
FIG. 3A is a view that illustrates changing the scale of a map view, and shows a map view on a scale smaller than a predetermined value before the scale is changed (1:40000 scale)
Figure 3B:
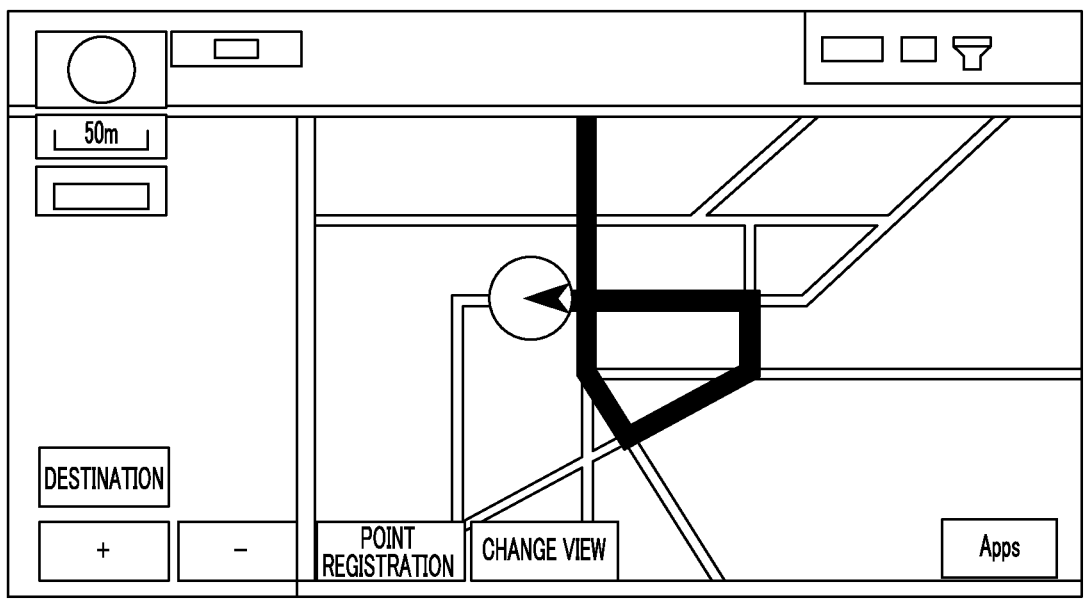
FIG. 3B is a view that illustrates changing the scale of a map view, and shows a map view on a scale larger than or equal to the predetermined value after the scale is changed (1:5000 scale)

FIG. 2 is a flowchart that schematically shows an example of the map scale changing process that is executed by the navigation system 1 according to the present embodiment. FIG. 3A and FIG. 3B are views that illustrate changing a map view. FIG. 3A shows a map view on a scale smaller than the predetermined value before the scale is changed (1:40000 scale). FIG. 3B shows a map view on a scale larger than or equal to the predetermined value after the scale is changed (1:5000 scale).

The process based on the flowchart of FIG. 2 is, for example, repeatedly executed at predetermined time intervals when a map view is shown on the display 60 in a period from completion of the initial process of the ECU 50 after the IG-ON of the vehicle 100 to when the ignition of the vehicle 100 is turned off (IG-OFF).

Referring to FIG. 2, in step S102, the determination unit 52 determines whether the user of the vehicle 100 is getting lost on the basis of information about the traveling status of the vehicle 100. When the determination unit 52 determines that the user is getting lost, the determination unit 52 proceeds to step S104. When the determination unit 52 determines that the user is not getting lost, the determination unit 52 ends the current process.

In step S104, the display control unit 51 determines whether the scale of the map view shown on the display 60 corresponds to a town map from which minor streets, and the like, are visually recognizable (for example, a map of 1:2500 scale or a map of 1:5000 scale). That is, the display control unit 51 determines whether the scale of the map view shown on the display 60 is smaller than the predetermined value corresponding to a town map (for example, 1:5000 scale). When the scale of the map view shown on the display 60 is smaller than the predetermined value, the display control unit 51 proceeds to step S106; otherwise, the display control unit 51 ends the current process.

In step S106, the display control unit 51 increases the scale of the map view to a scale corresponding to a town map (a scale larger than or equal to the predetermined value, that is, 1:5000 scale). For example, as shown in FIG. 3A, minor streets in a residential area are not visually recognizable from the map view on a scale smaller than the predetermined value, whereas, as shown in FIG. 3B, when the map view is changed to a town map on a scale larger than or equal to the predetermined value, that is, 1:5000 scale, the user is allowed to visually recognize minor streets in a residential area. Thus, since the map view is automatically changed to a map view from which minor streets are visually recognizable, it is possible to improve the convenience of the user who is getting lost. Particularly, in a situation in which the user cannot depend on route guidance that is performed by the navigation system 1, for example, when route guidance is not being performed by the navigation system 1 (that is, when the user has not set a destination) or when the vehicle 100 is traveling off a guidance route of the navigation system 1, it is possible to improve the convenience of the user.

In step S108, the determination unit 52 determines whether the vehicle 100 has gone out from a residential area. For example, when the width of the road on which the vehicle 100 is traveling is not smaller than the predetermined width (that is, the width of the road is larger than or equal to the predetermined width) as described above, the determination unit 52 determines that the vehicle 100 has gone out from a residential area; otherwise, the determination unit 52 determines that the vehicle 100 has not gone out from a residential area. When the vehicle 100 has not gone out from a residential area, the determination unit 52 repeats the process of this step. When the vehicle 100 has gone out from a residential area, the determination unit 52 proceeds to step S110.

The above-described predetermined width is defined in advance as a threshold by which it is possible to determine whether the road on which the vehicle 100 is traveling corresponds to a residential area.

In step S110, the display control unit 51 returns the scale of the map view shown on the display 60 to the original scale (the scale before the map view is magnified), and ends the current process.

Next, a specific example of the determination process in step S102 of FIG. 2, that is, the process of determining whether the user of the vehicle 100 is getting lost (getting-lost determination process), which is executed by the determination unit 52, will be described with reference to FIG. 4 to FIG. 8.

Figure 4:
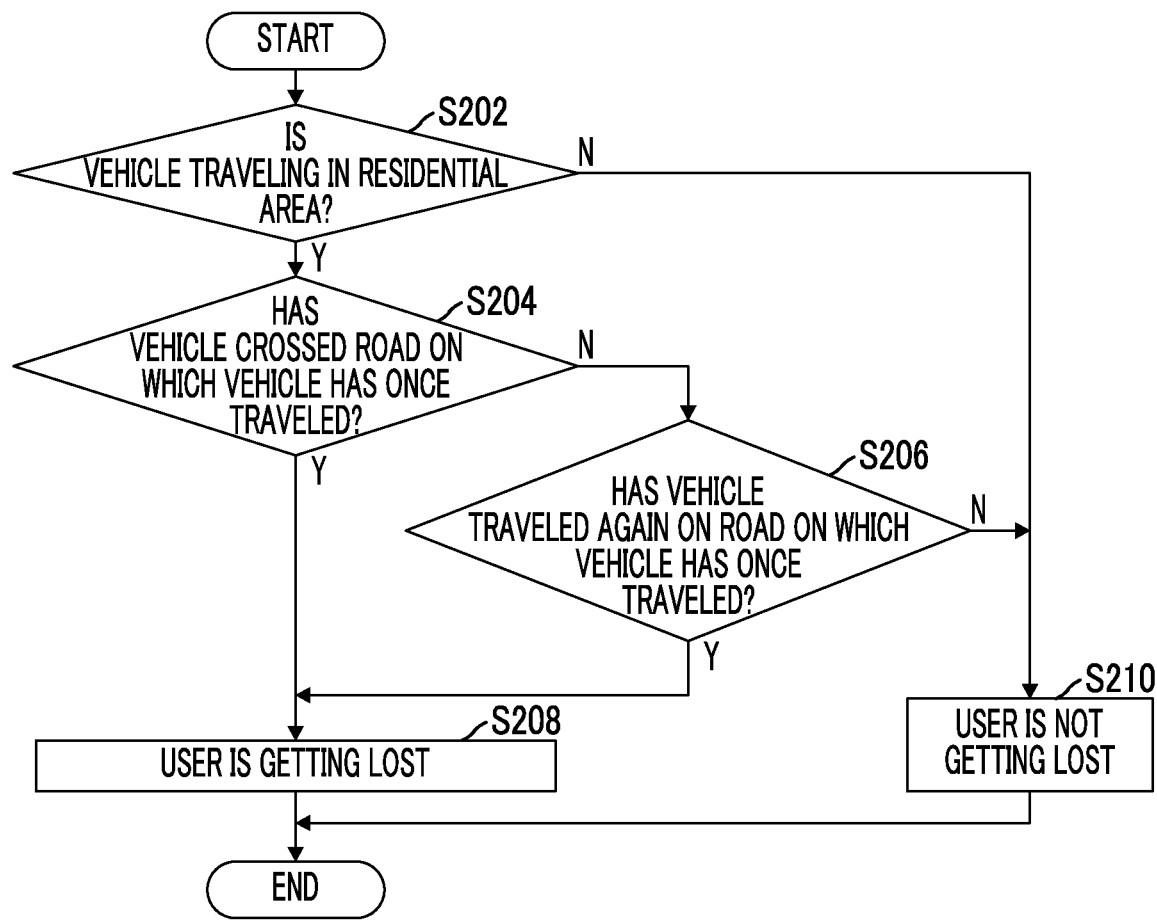
FIG. 4 is a flowchart that schematically shows an example of a getting-lost determination process that is executed by a determination unit.
Figure 5A:
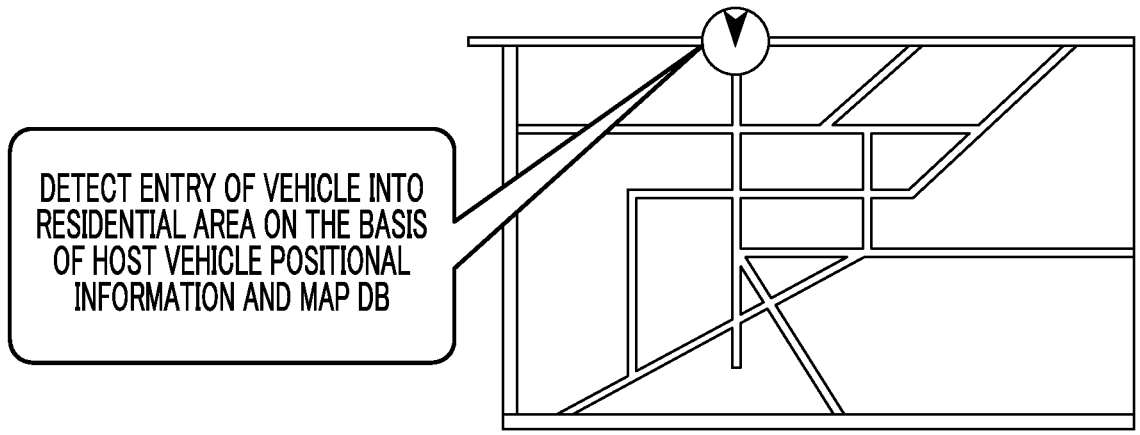
FIG. 5A is a view that illustrates an example of the getting-lost determination process that is executed by the determination unit.
Figure 5B:
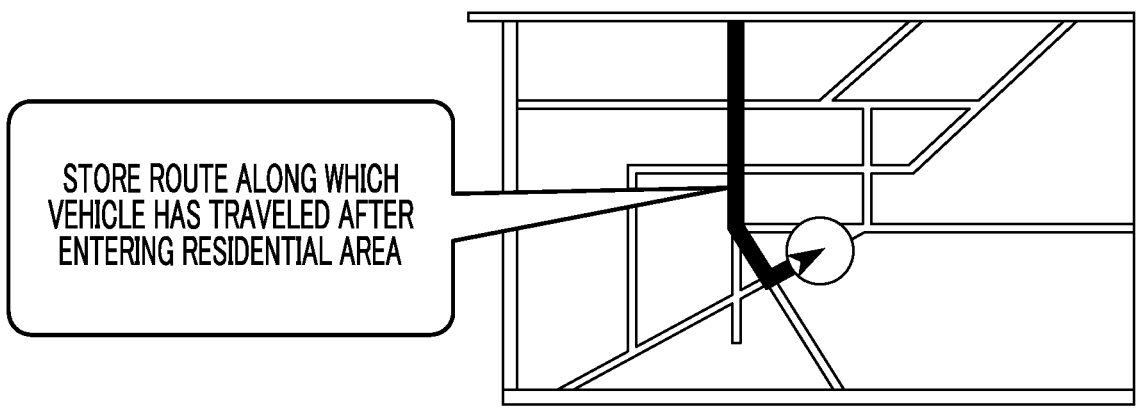
FIG. 5B is a view that illustrates an example of the getting-lost determination process that is executed by the determination unit.
Figure 5C:
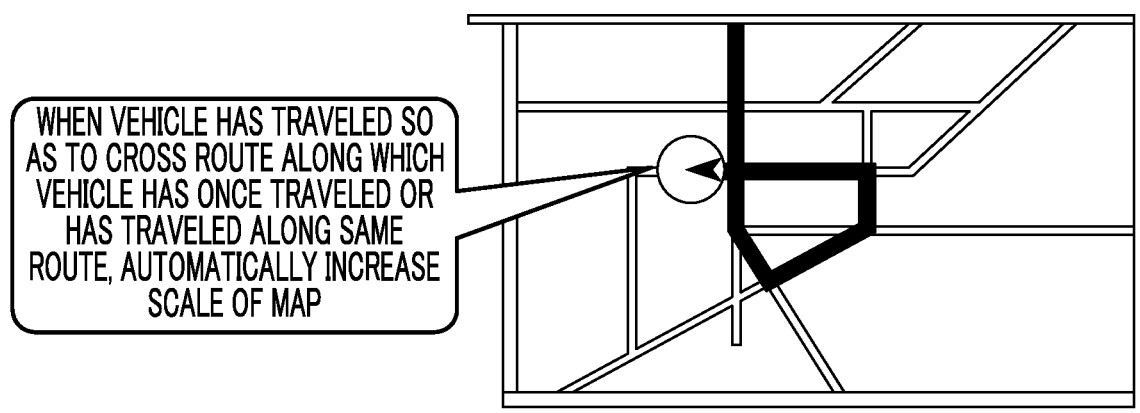
FIG. 5C is a view that illustrates an example of the getting-lost determination process that is executed by the determination unit.

FIG. 4 is a flowchart that schematically shows an example of the getting-lost determination process that is executed by the determination unit 52. FIG. 5A, FIG. 5B and FIG. 5C are views that illustrate an example of the getting-lost determination process that is executed by the determination unit 52.

Referring to FIG. 4, in step S202, the determination unit 52 determines whether the vehicle 100 is traveling in a residential area. Specifically, the determination unit 52 identifies a road on which the vehicle 100 is traveling and the width of the road on the basis of the position of the vehicle 100, detected by the GPS sensor 10, and the map information 531. When the width of the road on which the vehicle 100 is traveling is smaller than the predetermined width, the determination unit 52 determines that the vehicle 100 is traveling in a residential area; otherwise, the determination unit 52 determines that the vehicle 100 is not traveling in a residential area. When the determination unit 52 determines that the vehicle 100 is traveling in a residential area, the determination unit 52 proceeds to step S204; otherwise, the determination unit 52 proceeds to step S210.

In step S204, the determination unit 52 determines whether the vehicle 100 has crossed a road on which the vehicle 100 has once traveled in a period during which the vehicle 100 remains traveling in a residential area. Specifically, the determination unit 52 detects that the vehicle 100 has entered a residential area on the basis of the position of the vehicle 100, detected by the GPS sensor 10, and the map information 531 as shown in FIG. 5A, and stores the travel route of the vehicle 100 from when the vehicle 100 has entered a residential area in the internal memory, or the like, of the ECU 50 and sequentially updates the stored travel route as shown in FIG. 5B. The determination unit 52 determines whether the vehicle 100 has crossed a road on which the vehicle 100 has once traveled on the basis of the travel route of the vehicle, stored in the internal memory and updated. As shown in FIG. 5C, when the determination unit 52 determines that the vehicle 100 has not crossed a road on which the vehicle 100 has once traveled in a period in which the vehicle 100 remains traveling in a residential area, the determination unit 52 proceeds to step S206; whereas when the determination unit 52 determines that the vehicle 100 has crossed a road on which the vehicle 100 has once traveled, the determination unit 52 proceeds to step S208.

In step S206, the determination unit 52 determines whether the vehicle 100 has traveled again on a road on which the vehicle 100 has once traveled in a period during which the vehicle 100 remains traveling in a residential area. Specifically, the determination unit 52, as in the case of step S204, determines whether the vehicle 100 has traveled again on a road on which the vehicle 100 has once traveled on the basis of the travel route of the vehicle 100, stored in the internal memory and updated. When the determination unit 52 determines that the vehicle 100 has traveled again on a road on which the vehicle 100 has once traveled in a period during which the vehicle 100 remains traveling in a residential area, the determination unit 52 proceeds to step S208; whereas, when the determination unit 52 determines that the vehicle 100 has not traveled again on a road on which the vehicle 100 has once traveled, the determination unit 52 proceeds to step S210.

The sequence of the processes of step S204 and step S206 may be interchanged.

In step S208, the determination unit 52 determines that the user of the vehicle 100 is getting lost, and ends the current process. This is because, when the vehicle 100 has crossed a road on which the vehicle 100 has once traveled in a residential area or has traveled again on the road, it may be determined that the user of the vehicle 100 does not hold a route to travel, and the user is highly likely to be getting lost.

On the other hand, in step S210, the determination unit 52 determines that the user of the vehicle 100 is not getting lost, and ends the current process.

Figure 6:
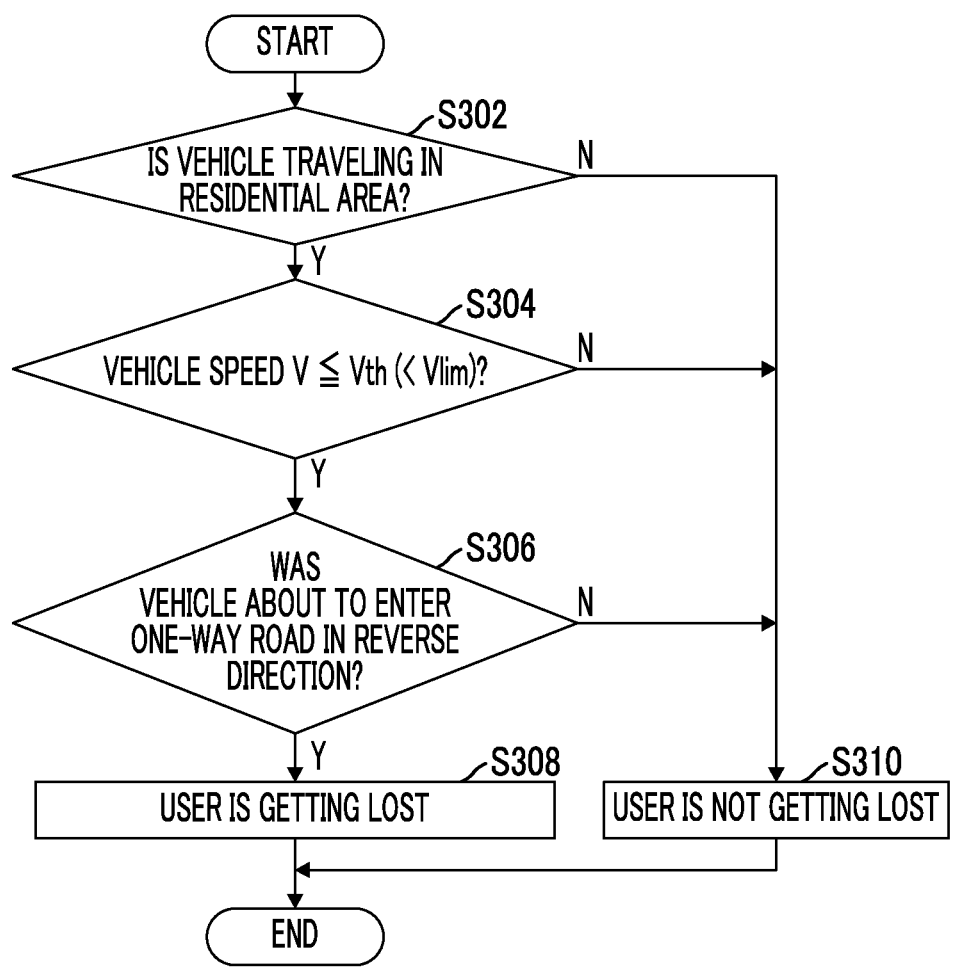
FIG. 6 is a flowchart that schematically shows another example of the getting-lost determination process that is executed by the determination unit.
Figure 7:
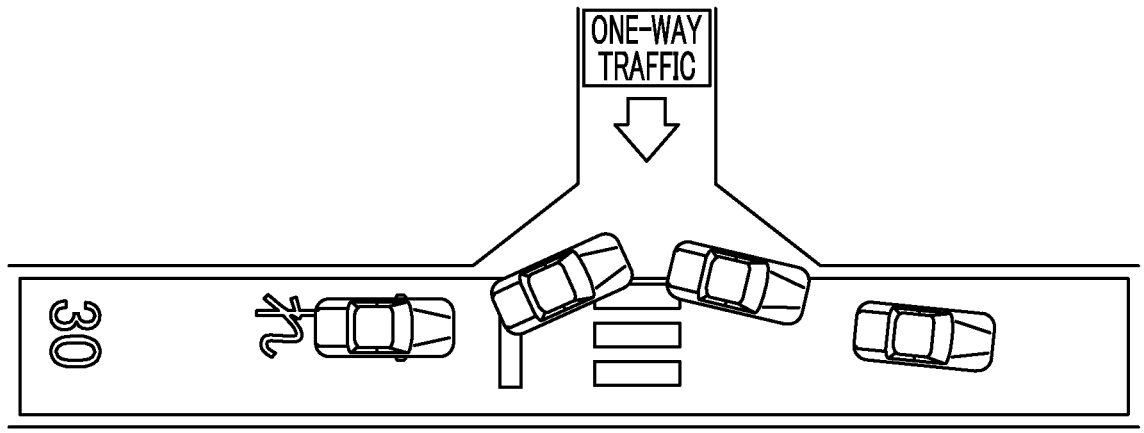
FIG. 7 is a view that illustrates another example of the getting-lost determination process that is executed by the determination unit.

Next, FIG. 6 is a flowchart that schematically shows another example of the getting-lost determination process that is executed by the determination unit 52. FIG. 7 is a view that illustrates another example of the getting-lost determination process that is executed by the determination unit 52.

Referring to FIG. 6, in step S302, the determination unit 52 determines whether the vehicle 100 is traveling in a residential area. Specifically, the determination unit 52 identifies a road on which the vehicle 100 is traveling and the width of the road on the basis of the position of the vehicle 100, detected by the GPS sensor 10, and the map information 531. When the width of the road on which the vehicle 100 is traveling is smaller than the predetermined width, the determination unit 52 determines that the vehicle 100 is traveling in a residential area; otherwise, the determination unit 52 determines that the vehicle 100 is not traveling in a residential area. When the determination unit 52 determines that the vehicle 100 is traveling in a residential area, the determination unit 52 proceeds to step S304; otherwise, the determination unit 52 proceeds to step S310.

In step S304, the determination unit 52 determines whether the vehicle speed V of the vehicle 100 is lower than or equal to a predetermined speed Vth (for example, a half of a regulation speed Vlim) that is set so as to be lower than the regulation speed Vlim of the road on which the vehicle 100 is traveling on the basis of a detected signal that the ECU 50 receives from the vehicle speed sensor 20. When the vehicle speed V of the vehicle 100 is lower than or equal to the predetermined speed Vth, the determination unit 52 proceeds to step S306. When the vehicle speed V of the vehicle 100 is not lower than or equal to the predetermined speed Vth, the determination unit 52 proceeds to step S310.

In step S306, the determination unit 52 determines whether the vehicle 100 was about to enter a one-way road in the reverse direction on the basis of detected signals that the ECU 50 receives from the GPS sensor 10 and the steering angle sensor 30. That is, the determination unit 52 determines whether the steering angle of the vehicle 100 indicates that the vehicle 100 was about to enter a one-way road in the reverse direction. Specifically, as shown in FIG. 7, the determination unit 52 determines whether the steering angle of the vehicle 100 indicates a series of operations that the vehicle 100 is steered to some extent in a direction toward a one-way road (in the drawing, leftward direction) near a point at which a road on which the vehicle 100 travels intersects with a no-entry one-way road, the vehicle 100 is then steered to a similar extent in the opposite direction (in the drawing, rightward direction) and, after that, the vehicle 100 returns to a straight-ahead traveling state. When the steering angle of the vehicle 100 indicates that the vehicle 100 was about to enter a one-way road in the reverse direction, the determination unit 52 proceeds to step S308; otherwise, the determination unit 52 proceeds to step S310.

In step S308, the determination unit 52 determines that the user of the vehicle 100 is getting lost, and ends the current process. This is because, when the vehicle 100 traveled in a residential area at a speed sufficiently lower than a regulation speed and was about to enter a one-way road, it may be determined that the user of the vehicle 100 does not hold a route to travel, and the user is highly likely to be getting lost.

On the other hand, in step S310, the determination unit 52 determines that the user of the vehicle 100 is not getting lost, and ends the current process.

Figure 8:
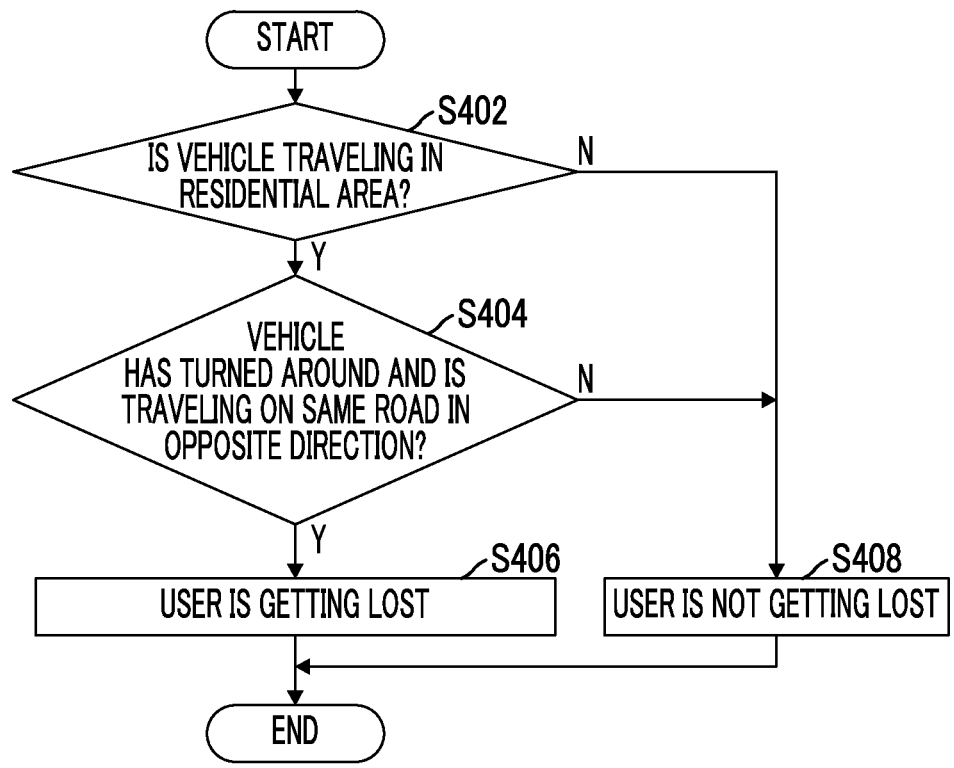
FIG. 8 is a flowchart that schematically shows further another example of the getting-lost determination process that is executed by the determination unit.

Next, FIG. 8 is a flowchart that schematically shows further another example of the getting-lost determination process that is executed by the determination unit 52.

Referring to FIG. 8, in step S402, the determination unit 52 determines whether the vehicle 100 is traveling in a residential area. Specifically, the determination unit 52 identifies a road on which the vehicle 100 is traveling and the width of the road on the basis of the position of the vehicle 100, detected by the GPS sensor 10, and the map information 531. When the width of the road on which the vehicle 100 is traveling is smaller than the predetermined width, the determination unit 52 determines that the vehicle 100 is traveling in a residential area; otherwise, the determination unit 52 determines that the vehicle 100 is not traveling in a residential area. When the determination unit 52 determines that the vehicle 100 is traveling in a residential area, the determination unit 52 proceeds to step S404; otherwise, the determination unit 52 proceeds to step S408.

In step S404, the determination unit 52 determines whether the vehicle 100 has turned around and is traveling on the same road in the reverse direction on the basis of the position of the vehicle 100, detected by the GPS sensor 10, and the map information 531. When the vehicle 100 has turned around and is traveling on the same road in the reverse direction, the determination unit 52 proceeds to step S406; otherwise, the determination unit 52 proceeds to step S408.

Turning around of the vehicle 100 in the present example includes a mode in which the vehicle 100 makes a U-turn and travels on the same road in the opposite direction in a forward traveling state and a mode in which the vehicle 100 moves backward and travels on the same road in the opposite direction in a reverse traveling state.

In step S406, the determination unit 52 determines that the user of the vehicle 100 is getting lost, and ends the current process. This is because, when the vehicle 100 has turned around and is traveling on the same road in the opposite direction in a residential area, it may be determined that the user of the vehicle 100 does not hold a route to travel, and the user is highly likely to be getting lost.

On the other hand, in step S408, the determination unit 52 determines that the user of the vehicle 100 is not getting lost, and ends the current process.

In this way, the navigation system 1 according to the present embodiment includes the display 60, the GPS sensor 10, the display control unit 51, the storage unit 53, and the determination unit 52. The display 60 is provided in the cabin of the vehicle 100. The GPS sensor 10 is provided in the vehicle 100, and detects the position of the vehicle 100. The display control unit 51 is provided in the vehicle 100, causes the display 60 to show a map view, and causes the display 60 to show an image indicating the position of the vehicle 100, detected by the GPS sensor 10, on the map view in a superimposed manner. The storage unit 53 is provided in the vehicle 100, and stores the map information 531. The determination unit 52 is provided in the vehicle 100, acquires information about the traveling status of the vehicle 100, and determines whether the user of the vehicle 100 is getting lost on the basis of the information and the map information. When the determination unit 52 determines that the user is getting lost and when the scale of the map view is smaller than the predetermined value, the display control unit 51 sets the scale of the map view to the predetermined value or larger. Thus, it is possible to hold a travel route, or the like, of the vehicle 100 on the basis of information about the traveling status of the vehicle 100 and the map information and determine whether the user of the vehicle 100 is getting lost. Therefore, when the user of the vehicle 100 is getting lost and when the scale of the map view is smaller than the predetermined value, it is possible to increase the scale of the map view to the predetermined value or larger. For this reason, in a situation in which the user needs to increase the scale of the map view like a situation in which the user is getting lost, it is possible to improve the convenience of the user by automatically setting the scale of the map view to the predetermined value or larger.

In the present embodiment, the determination unit 52 acquires the position of the vehicle 100 from the GPS sensor 10 as information about the traveling status of the vehicle 100, identifies a road on which the vehicle 100 is travelling and the width of the road on the basis of the position of the vehicle 100 and the map information 531, and, when the vehicle 100 has crossed a road on which the vehicle 100 has once traveled or has traveled again on the road in a period during which the width of the road on which the vehicle 100 is traveling remains smaller than the predetermined width, determines that the user is getting lost. Thus, when the vehicle 100 has crossed a road on which the vehicle 100 has once traveled or has traveled again on the road in a period during which the vehicle 100 is traveling on a relatively narrow road like in a residential area, or the like, it may be specifically determined that the user of the vehicle 100 is getting lost.

The navigation system 1 according to the present embodiment includes the vehicle speed sensor 20 and the steering angle sensor 30. The vehicle speed sensor 20 is provided in the vehicle 100, and detects the vehicle speed of the vehicle 100. The steering angle sensor 30 is provided in the vehicle 100, and detects the steering angle of the vehicle 100. The determination unit 52 acquires the position, vehicle speed and steering angle of the vehicle 100 from the GPS sensor 10, the vehicle speed sensor 20 and the steering angle sensor 30 as information about the traveling status of the vehicle 100, identifies a road on which the vehicle 100 is traveling and the width of the road on the basis of the position of the vehicle 100 and the map information 531, and, when the width of the road on which the vehicle 100 is traveling is smaller than the predetermined width, when the vehicle speed V of the vehicle 100 is lower than or equal to the predetermined speed Vth lower than the regulation speed Vlim of the traveling road and when the steering angle of the vehicle 100 indicates that the vehicle 100 was about to enter a one-way road in the reverse direction, determines that the user is getting lost. Thus, when the vehicle 100 is traveling on a relatively narrow road like in a residential area, or the like, when the vehicle speed is somewhat lower than a regulation speed and when the vehicle 100 was about to enter a one-way road in the reverse direction, it may be specifically determined that the user of the vehicle 100 is getting lost.

In the present embodiment, the determination unit 52 acquires the position of the vehicle 100 from the GPS sensor 10 as information about the traveling status of the vehicle 100, identifies a road on which the vehicle 100 is traveling and the width of the road on the basis of the position of the vehicle 100 and the map information 531, and, when the width of the road on which the vehicle 100 is traveling is smaller than the predetermined width and the vehicle 100 has turned around during traveling and has traveled in the opposite direction, determines that the user is getting lost. Thus, when the vehicle 100 is traveling on a relatively narrow road like in a residential area, or the like, and when the vehicle 100 has turned around by U-turn, moving backward, or the like and has traveled in the opposite direction, it may be specifically determined that the user of the vehicle 100 is getting lost.

In step S102 of FIG. 2 in the present embodiment, the determination unit 52 is not required to use all the determination methods of FIG. 4, FIG. 6 and FIG. 8. The determination unit 52 just needs to determine whether the user of the vehicle 100 is getting lost with the use of at least one of these determination methods. When the plurality of determination methods among FIG. 4, FIG. 6 and FIG. 8 are used, and when it is determined in the process of step S102 that the user of the vehicle 100 is getting lost with the use of at least one of the plurality of determination methods, the determination unit 52 may determine that the user of the vehicle 100 is getting lost.

In the present embodiment, the display control unit 51 sets the scale of the map view to the predetermined value or larger as a result of the fact that the determination unit 52 determines that the user is getting lost, and then, when the width of a road on which the vehicle 100 is traveling becomes not smaller than the predetermined width, returns the scale of the map view to a scale before the scale is set to the predetermined value or larger. Thus, when the vehicle 100 has gone out from a relatively narrow road like in a residential area, or the like, to a relatively wide road, it may be determined that the user has escaped from a getting-lost situation. For this reason, in this case, by automatically returning the scale of the map view to a scale before the scale is set to the predetermined value or larger, the user does not need to perform an operation to return the scale of the map view to a scale before the scale is set to the predetermined value or larger, so it is possible to improve the convenience of the user.

Second Embodiment

Next, a second embodiment will be described.

A navigation system 1A according to the present embodiment mainly differs from the navigation system 1 according to the first embodiment in that the determination unit 52 is replaced with a determination unit 222A provided in a center 200A remote from a vehicle 100A. Hereinafter, like reference numerals denote similar components to those of the first embodiment, and different portions will be mainly described.

Figure 9:
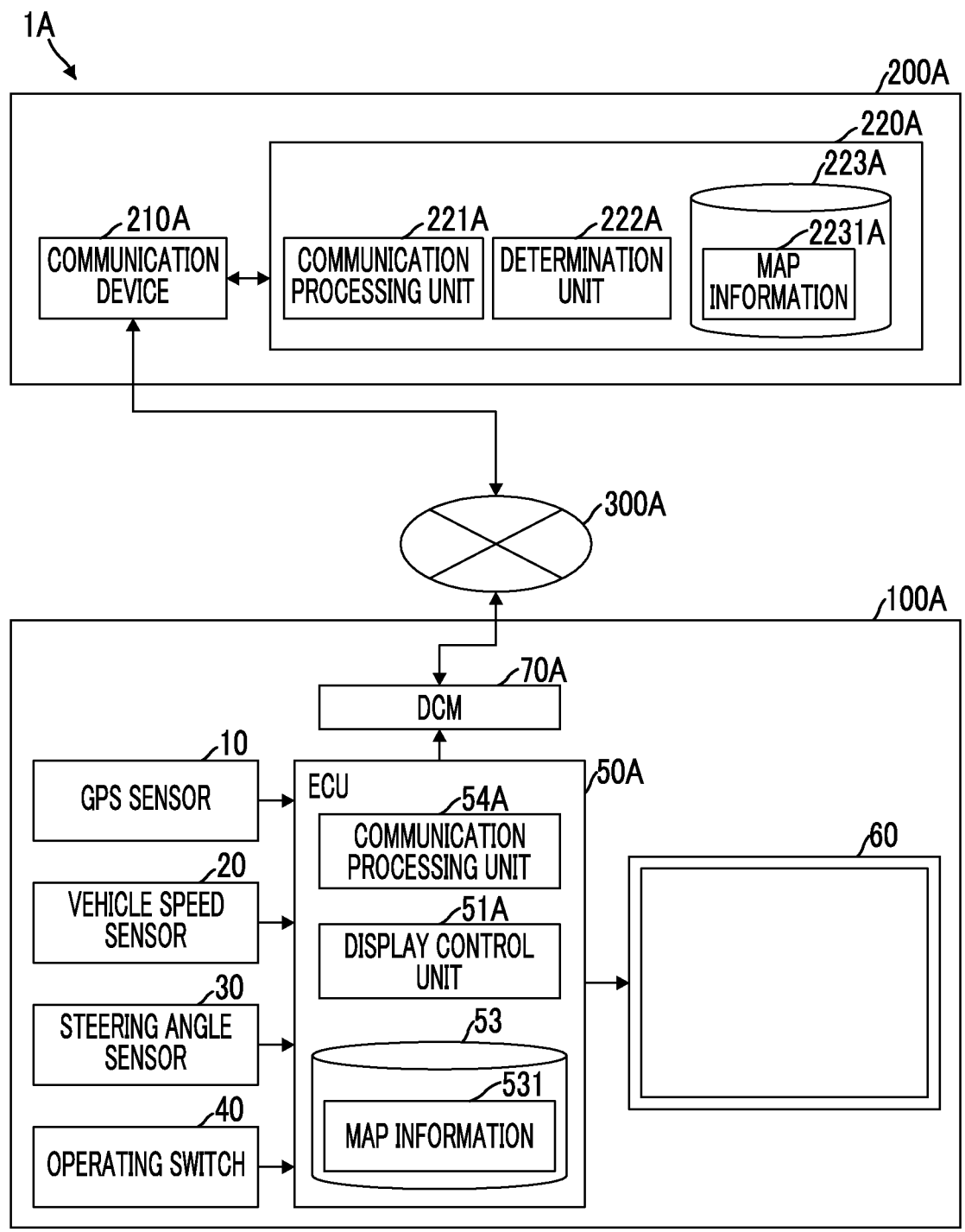
FIG. 9 is a block diagram that schematically shows an example of the configuration of a navigation system according to a second embodiment.

FIG. 9 is a block diagram that schematically shows an example of the configuration of the navigation system 1A according to the present embodiment. The navigation system 1A shows a map view of an area around the current position of the vehicle 100A in a vehicle cabin (display 60 (described later)) in response to an operation of a user of the vehicle 100A. The navigation system 1A shows a route from the current position of the vehicle 100A to a destination that is set by the user or a destination that is automatically set on the basis of a past travel history, or the like, on the map view, and performs route guidance. The following description does not depend on whether the navigation system 1A is performing route guidance.

The navigation system 1A (an example of a display system) includes the vehicle 100A and the center 200A. The center 200A is arranged remote from the vehicle 100A, and is bidirectionally communicable with the vehicle 100A via a predetermined communication network 300A.

The vehicle 100A includes the GPS sensor 10, the vehicle speed sensor 20, the steering angle sensor 30, the operating switch 40, an ECU 50A, the display 60 and a data communication module (DCM) 70A.

The GPS sensor 10, the vehicle speed sensor 20, the steering angle sensor 30, the operating switch 40, the ECU 50A, the display 60, the DCM 70A, and the like, provided in the vehicle 100A may be provided in the vehicle 100A in such a manner that these are mounted on the vehicle 100A, that is, these are incorporated in the vehicle 100A, or may be provided in the vehicle 100A in such a manner that these are movable from the vehicle 100A. Hereinafter, the GPS sensor 10, the vehicle speed sensor 20, the steering angle sensor 30, the operating switch 40, the ECU 50A, the display 60, the DCM 70A, and the like, provided in the vehicle 100A are predicated on the manner that these are mounted on the vehicle 100A (that is, these are incorporated in the vehicle 100A). The functions of the GPS sensor 10, the vehicle speed sensor 20, the steering angle sensor 30, the operating switch 40, the ECU 50A, the display 60, the DCM 70A, and the like, are similar to those in the case of the first embodiment, and may be, for example, implemented by a mobile terminal (for example, a smartphone, a tablet terminal, or the like) carried by the user into the cabin of the vehicle 100A.

The ECU 50A includes a communication processing unit 54A, a display control unit 51A and the storage unit 53.

The communication processing unit 54A (an example of a first transmission unit and a second reception unit) controls the DCM 70, and transmits or receives various signals (data signals, control signals, and the like) with the center 200A via the communication network 300A. For example, the communication processing unit 54A transmits detected signals that are received from the GPS sensor 10, the vehicle speed sensor 20 and the steering angle sensor 30 to the center 200A. The communication processing unit 54A receives various signals (for example, route information, a scale increase signal, a scale return signal, and the like (described later)) that are transmitted from the center 200A.

The display control unit 51A, different from that of the first embodiment, changes the scale of a map view in response to a scale increase signal and a scale return signal that are received by the communication processing unit 54A. Details will be described later.

When the navigation system 1A performs route guidance (that is, when the communication processing unit 54A has received route information (described later) from the center 200A), the display control unit 51A may cause the display 60 to show a route to a destination on the map view in a known display mode.

The DCM 70A is a communication device that communicates with the center 200A via the communication network 300A.

Instead of the DCM 70A, any communication device that is communicable with the center 200A via the communication network 300A may be employed.

The center 200A includes a communication device 210A and a control unit 220A.

The communication device 210A is any communication device that communicates with the vehicle 100A via the communication network 300A.

The control unit 220A executes various control processes in the center 200A. The control unit 220A is, for example, mainly formed of one or multiple server computers including a CPU, a RAM, a ROM and an I/O, and is able to implement various control processes by executing various programs stored in the ROM on the CPU. The control unit 220A includes a communication processing unit 221A and a determination unit 222A as functional units that are implemented by executing one or more programs stored in the ROM. The control unit 220A includes a storage unit 223A as a storage area defined in advance in a storage device inside the one or multiple server computers.

For example, the control unit 220A may perform route guidance for the vehicle 100A by generating a route from the current position of the vehicle 100A to a destination and transmitting route information to the vehicle 100A in response to a route guidance request that is transmitted from the vehicle 100A (communication processing unit 54A). For example, the control unit 220A, as will be described later, may perform route guidance for the vehicle 100A by estimating a destination on the basis of a past moving history of the vehicle 100, which is acquired from a detected signal of the GPS sensor 10 that the communication processing unit 221A receives from the vehicle 100A, generating a route from the current position of the vehicle 100A to the estimated destination and transmitting the generated route to the vehicle 100A as route information.

The communication processing unit 221A (an example of a first reception unit and a second transmission unit) controls the communication device 210A, and transmits or receives various signals (data signals, control signals, and the like) with the vehicle 100A via the communication network 300A. For example, the communication processing unit 221A receives detected signals of the GPS sensor 10, vehicle speed sensor 20 and steering angle sensor 30, which are transmitted from the vehicle 100A. The communication processing unit 221A transmits route information, a scale increase signal a scale return signal, and the like, to the vehicle 100A in response to a request from the determination unit 222A, or the like.

The determination unit 222A, as well as the determination unit 52 according to the first embodiment, determines whether the user of the vehicle 100A is getting lost on the basis of information about the traveling status of the vehicle 100A. Specifically, as in the case of the first embodiment, it is possible to determine whether the user of the vehicle 100A is getting lost with the use of at least one of the determination methods shown in the flowcharts of FIG. 4, FIG. 6 and FIG. 8. When the determination unit 222A determines that the user of the vehicle 100A is getting lost, the determination unit 222A transmits, to the communication processing unit 221A, a request to transmit a scale increase signal. After the determination unit 222A determines that the vehicle 100A is getting lost, the determination unit 222A determines whether the vehicle 100A has gone out from a residential area. Specifically, as well as the determination unit 52 according to the first embodiment, the determination unit 222A identifies a road on which the vehicle 100A is traveling and the width of the road on the basis of the position of the vehicle 100A, detected by the GPS sensor 10, and map information 2231A stored in the storage unit 223A. When the width of the road on which the vehicle 100A is traveling is not smaller than the predetermined width (that is, the width of the road is larger than or equal to the predetermined width), the determination unit 222A determines that the vehicle 100A has gone out from a residential area; otherwise, the determination unit 222A determines that the vehicle 100A has not gone out from a residential area. After the determination unit 222A determines that the vehicle 100A is getting lost, when the determination unit 222A determines that the vehicle 100A has gone out from a residential area, the determination unit 222A transmits, to the communication processing unit 221A, a request to transmit a scale return signal.

The storage unit 223A contains the map information 2231A as described above. The map information 2231A, as well as the map information 531 of the vehicle 100, contains information, such as the width of each road, the regulation speed of each road, whether each road is one-way traffic, and the direction of one-way traffic.

Next, a map scale changing process that is executed by the display control unit 51A of the vehicle 100A and the control unit 220A of the center 200A in cooperation with each other will be described with reference to FIG. 10 and FIG. 11.

Figure 10:
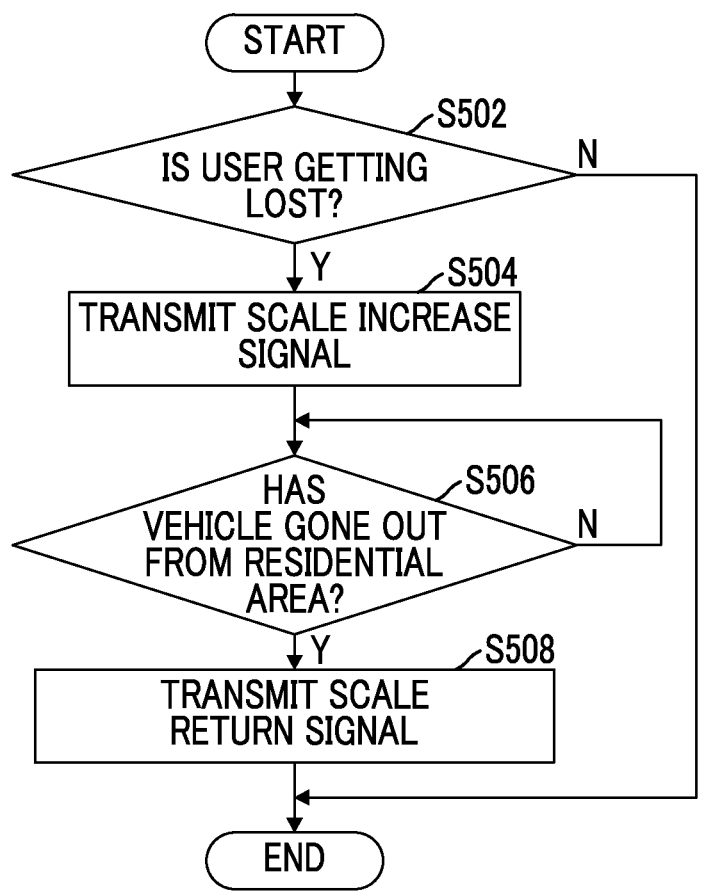
FIG. 10 is a flowchart that schematically shows an example of a map scale changing process that is executed by a control unit of a center according to the second embodiment.

FIG. 10 is a flowchart that schematically shows an example of the map scale changing process that is executed by the control unit 220A of the center 200A. FIG. 11 is a flowchart that schematically shows an example of the map scale changing process that is executed by the display control unit 51A of the vehicle 100A.

Figure 11:
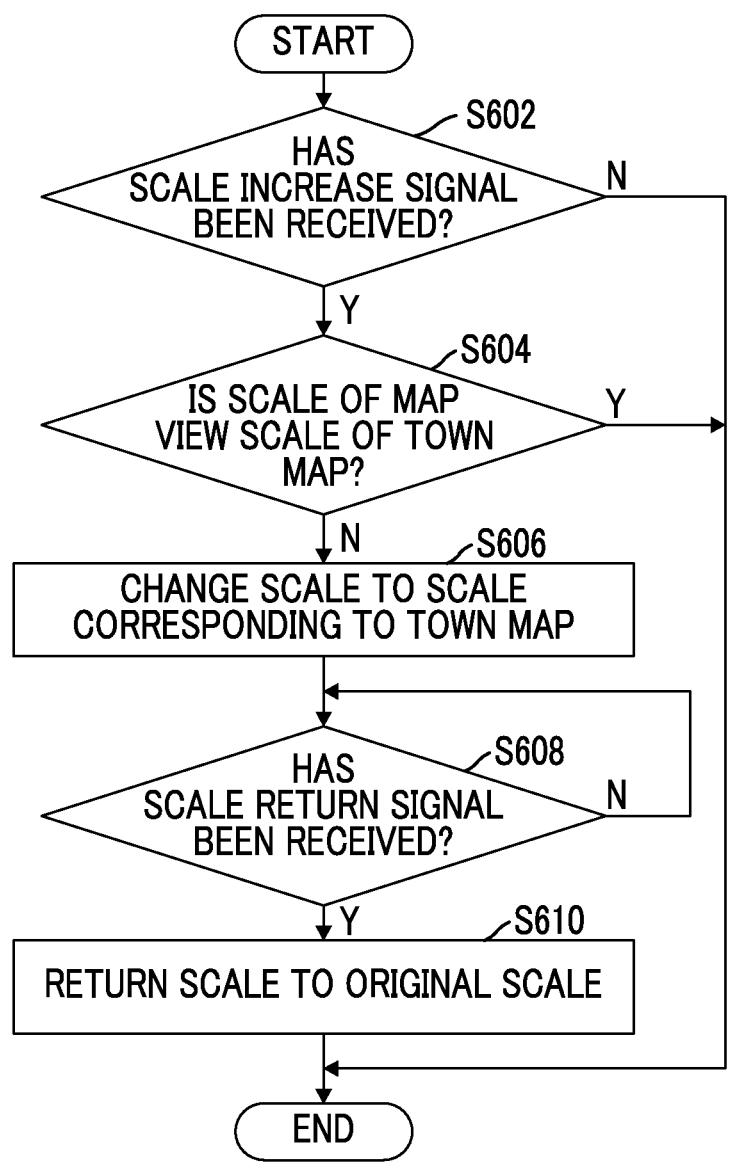
FIG. 11 is a flowchart that schematically shows an example of a map scale changing process that is executed by a display control unit of a vehicle according to the second embodiment.

The processes based on the flowcharts of FIG. 10 and FIG. 11, as in the case of FIG. 2, are, for example, repeatedly executed at predetermined time intervals when a map view is shown on the display 60 in a period from completion of the initial process of the ECU 50A after the IG-ON of the vehicle 100A to when the ignition of the vehicle 100A is turned off (IG-OFF). The control unit 220A of the center 200A, for example, recognizes that the IG-ON of the vehicle 100A has been performed on the basis of the fact that the communication processing unit 221A begins to receive various signals from the vehicle 100A.

Initially, referring to FIG. 10, in step S502, the determination unit 222A, as in the case of step S102 of FIG. 2, determines whether the user of the vehicle 100A is getting lost. When the determination unit 222A determines that the user of the vehicle 100A is getting lost, the determination unit 222A proceeds to step S504; otherwise, the determination unit 222A ends the current process.

In step S504, the communication processing unit 221A transmits a scale increase signal to the vehicle 100A in response to a transmission request from the determination unit 222A.

In step S506, the determination unit 222A, as in the case of step S108 of FIG. 2, determines whether the vehicle 100A has gone out from a residential area. When the determination unit 222A determines that the vehicle 100A has not gone out from a residential area, the determination unit 222A repeats the process of this step. When the determination unit 222A determines that the vehicle 100A has gone out from a residential area, the determination unit 222A proceeds to step S508.

In step S508, the communication processing unit 221A transmits a scale return signal to the vehicle 100A in response to a transmission request from the determination unit 222A, and ends the current process.

Next, referring to FIG. 11, in step S602, the display control unit 51A determines whether the communication processing unit 54A has received a scale increase signal. When the communication processing unit 54A has received a scale increase signal, the display control unit 51A proceeds to step S604. When the communication processing unit 54A has not received a scale increase signal, the display control unit 51A ends the current process.

In step S604, the display control unit 51A, as in the case of step S104 of FIG. 2, determines whether the scale of a map view shown on the display 60 corresponds to a town map from which minor streets, and the like, are visually recognizable (for example, a map on a scale larger than or equal to 1:2500 scale or 1:5000 scale). That is, the display control unit 51A determines whether the scale of the map view shown on the display 60 is smaller than the predetermined value (for example, 1:5000 scale) corresponding to a town map. When the scale of the map view shown on the display 60 is smaller than the predetermined value, the display control unit 51A proceeds to step S606; otherwise, the display control unit 51A ends the current process.

In step S606, the display control unit 51A, as in the case of step S106 of FIG. 2, sets the scale of the map view to the predetermined value or larger, and changes the map view to a town map. Thus, as in the case of the first embodiment, the user is allowed to visually recognize minor streets in a residential area. Since the map view is automatically changed to a map view from which minor streets are visually recognizable, it is possible to improve the convenience of the user who is getting lost.

In step S608, the display control unit 51A determines whether the communication processing unit 54A has received a scale return signal. When the communication processing unit 54A has not received a scale return signal, the display control unit 51A repeats the process of this step. When the communication processing unit 54A has received a scale return signal, the display control unit 51A proceeds to step S610.

In step S610, the display control unit 51A, as in the case of step S110 of FIG. 2, returns the scale of the map view shown on the display 60 to the original scale (the scale before the scale of the map view is set to the predetermined value or larger), and ends the current process.

When the communication processing unit 54A does not receive a scale return signal due to communication failure, or the like, even when a certain period of time has elapsed, the display control unit 51A may return the scale of the map view shown on the display 60 to the scale before the scale of the map view is set to the predetermined value or larger irrespective of the process of step S608.

In this way, the navigation system 1A according to the present embodiment includes the display 60, the GPS sensor 10, the display control unit 51A, the communication processing unit 54A, the communication processing unit 221A, the storage unit 223A, the determination unit 222A and the communication processing unit 54A. The display 60 is provided in the cabin of the vehicle 100A. The GPS sensor 10 is provided in the vehicle 100A, and detects the position of the vehicle 100A. The display control unit 51A is provided in the vehicle 100A. The display control unit 51A causes the display 60 to show a map view, and causes the display 60 to show an image indicating the position of the vehicle 100A, detected by the GPS sensor 10, on a map view in a superimposed manner. The communication processing unit 54A is provided in the vehicle 100A. The communication processing unit 54A acquires information about the traveling status of the vehicle 100A, and transmits the information to the center 200A arranged remote from the vehicle 100A. The communication processing unit 221A is provided in the center 200A, and receives information about the traveling status of the vehicle 100A, transmitted from the vehicle 100A. The storage unit 223A is provided in the center 200A, and stores the map information 2231A. The determination unit 222A is provided in the center 200A, and determines whether the user of the vehicle 100A is getting lost on the basis of information received by the communication processing unit 221A and the map information 2231A. When the determination unit 222A determines that the user is getting lost, the communication processing unit 221A transmits a scale increase signal to the vehicle 100A. The communication processing unit 54A is provided in the vehicle 100A, and receives a scale increase signal that is transmitted from the center 200A. When the communication processing unit 54A has received a scale increase signal and when the scale of the map view is smaller than the predetermined value, the display control unit 51A sets the scale of the map view to the predetermined value or larger. Thus, the center 200A arranged remote from the vehicle 100A is able to acquire a travel route, or the like, of the vehicle 100A on the basis of information about the traveling status of the vehicle 100A and the map information 2231A and determine whether the user of the vehicle 100A is getting lost. Therefore, when the user of the vehicle 100A is getting lost and when the scale of the map view is relatively small, it is possible to set the scale of the map view to the predetermined value or larger on the basis of a control signal (scale increase signal) from the center 200A. For this reason, in a situation in which the user needs to set the scale of the map view to the predetermined value or larger like a situation in which the user is getting lost, the scale of the map view is automatically set to the predetermined value or larger, so it is possible to improve the convenience.

The embodiments of the disclosure are described above; however, the disclosure is not limited to the above-described specific embodiments. The embodiments of the disclosure may be variously modified or changed within the scope of the disclosure recited in the appended claims.

What is claimed is:

1. A display device comprising:
    a display provided inside a cabin of a vehicle;
    a position detector provided in the vehicle, the position detector being configured to detect a position of the vehicle;
    a storage device provided in the vehicle, the storage device being configured to store map information;
    a vehicle speed detector provided in the vehicle, the vehicle speed detector being configured to detect a vehicle speed of the vehicle;
    a steering angle detector provided in the vehicle, the steering angle detector being configured to detect a steering angle of the vehicle; and
    an electronic control unit provided in the vehicle, the electronic control unit being configured to:
        control the display such that a map view is shown on the display on a basis of the map information;

control the display such that an image indicating the position of the vehicle, detected by the position detector, is superimposed on the map view shown on the display;
acquire information about a traveling status of the vehicle;
determine whether a user of the vehicle is getting lost on a basis of the information about the traveling status of the vehicle and the map information; and
when the electronic control unit determines that the user is getting lost, control the display such that a scale of the map view shown on the display is set to a predetermined value or larger;
wherein the electronic control unit is configured to:
acquire the position, vehicle speed and steering angle of the vehicle from the position detector, the vehicle speed detector and the steering angle detector as the information about the traveling status of the vehicle;
identify a road on which the vehicle is traveling and a width of the road on a basis of the position of the vehicle and the map information; and
when the width of the road is smaller than a predetermined width, when the vehicle speed of the vehicle is lower than or equal to a predetermined speed lower than a regulation speed of the road and when the steering angle of the vehicle indicates that the vehicle was about to enter a one-way road in a reverse direction and subsequently returned to a straight-ahead traveling state, determine that the user is getting lost.

2. The display device according to claim 1, wherein the electronic control unit is configured to, when the vehicle has crossed a road on which the vehicle has once traveled or has traveled again on the road in a period during which the width of the road remains smaller than a predetermined width, determine that the user is getting lost.

3. The display device according to claim 1, wherein the electronic control unit is configured to, when the width of the road is smaller than a predetermined width and when the vehicle has turned around during traveling has traveled in an opposite direction, determine that the user is getting lost.

4. The display device according to claim 2, wherein the electronic control unit is configured to, when the electronic control unit controls the display such that the scale of the map view is set to the predetermined value or larger at a time when the electronic control unit determines that the user is getting lost and, after that, when the width of the road becomes larger than or equal to the predetermined width, control the display such that the scale of the map view is returned to a scale before being set to the predetermined value or larger.

5. A display system comprising:
a display provided inside a cabin of a vehicle;
a position detector provided in the vehicle, the position detector being configured to detect a position of the vehicle;
a vehicle speed detector provided in the vehicle, the vehicle speed detector being configured to detect a vehicle speed of the vehicle;
a steering angle detector provided in the vehicle, the steering angle detector being configured to detect a steering angle of the vehicle;
a first transmission unit provided in the vehicle, the first transmission unit being configured to acquire information about a traveling status of the vehicle and transmit the information to a center arranged remote from the vehicle;
a first reception unit provided in the center, the first reception unit being configured to receive the information transmitted from the first transmission unit;
a storage device provided in the center, the storage device being configured to store map information; and
a first electronic control unit provided in the center, the first electronic control unit being configured to determine whether a user of the vehicle is getting lost on a basis of the information received by the first reception unit and the map information;
a second transmission unit provided in the center;
a second reception unit provided in the vehicle, the second reception unit being configured to receive a signal that is transmitted from the second transmission unit;
a second electronic control unit provided in the vehicle, the second electronic control unit being configured to control the display such that a map view is shown on the display, wherein
the first electronic control unit is configured to control the second transmission unit such that the second transmission unit transmits a predetermined signal to the vehicle when the first electronic control unit determines that the user is getting lost,
the second electronic control unit is configured to control the display such that an image indicating the position of the vehicle, detected by the position detector, is superimposed on the map view shown on the display, and
the second electronic control unit is configured to, when the second reception unit has received the predetermined signal, control the display such that the scale of the map view is set to a predetermined value or larger,
wherein the first transmission unit is configured to acquire the position, vehicle speed and steering angle of the vehicle from the position detector, the vehicle speed detector and the steering angle detector as the information about the traveling status of the vehicle, and
wherein the first electronic control unit is configured to:
identify a road on which the vehicle is traveling and a width of the road on a basis of the position of the vehicle and the map information; and
when the width of the road is smaller than a predetermined width, when the vehicle speed of the vehicle is lower than or equal to a predetermined speed lower than a regulation speed of the road and when the steering angle of the vehicle indicates that the vehicle was about to enter a one-way road in a reverse direction and subsequently returned to a straight-ahead traveling state, determine that the user is getting lost.

* * * * *